United States Patent [19]

Belka

[11] Patent Number: 4,690,420
[45] Date of Patent: Sep. 1, 1987

[54] VIBRATION-RESISTANT, SELF-CENTERING ACCESSORY ATTACHMENT FOR A CYCLE

[75] Inventor: Heinrich Belka, Bielefeld, Fed. Rep. of Germany

[73] Assignee: ESGE-Marby GmbH & Co. KG, Bielefeld, Fed. Rep. of Germany

[21] Appl. No.: 858,196

[22] Filed: May 1, 1986

[51] Int. Cl.$^4$ .............................. B62H 1/02; B62J 7/04
[52] U.S. Cl. .............................. 280/289 A; 224/32 A; 280/301; 403/405.1
[58] Field of Search ................... 280/289 A, 293, 298, 280/301; 403/405.1; 269/43, 246, 236; 224/30 R, 32 R, 32 A

[56] References Cited

U.S. PATENT DOCUMENTS 2,307,235 1/1943 Pawsat .............................. 280/301

FOREIGN PATENT DOCUMENTS

G840960 12/1952 Fed. Rep. of Germany .
8225274 6/1982 Fed. Rep. of Germany .

*Primary Examiner*—John A. Pekar
*Attorney, Agent, or Firm*—Frishauf, Holtz, Goodman & Woodward

[57] ABSTRACT

To provide for vibration-resistant, self-centering, and universal attachment of an accessory such as a luggage carrier (3) or a kickstand (4) to essentially parallel or slightly divergent support struts (8, 12) of a cycle, such as a bicycle, moped, and the like, an attachment element is formed with a central portion (18) and two lateral flange or wing portions (19, 21), the central portion having a bore (24) extending therethrough. The flange portions (19, 21) are similar wedge-shaped elements with upper and lower surfaces diverging from outer end portions (33, 34) towards the central portion (18) to define, in cross section in a plane parallel to the axis of the aperture and transverse to the struts, triangular elements having bases (22, 23) adjacent the central portion, which bases may be extended into ribs if the wing or flange portions and the central portion are formed with hollows. The flange portions are elastically deformable in a direction parallel to the axis of the bore, which deformability is assisted by forming the flange or wing portions as hollow triangle-prismatic structures. Preferably, a groove is cut in the central portion, dimensioned to receive a hexagonal nut so that a bolt can be threaded into the element without requiring a holding wrench. The element can be made by being cut from a long aluminum profile rail, or by pressure casting.

17 Claims, 3 Drawing Figures

VIBRATION-RESISTANT, SELF-CENTERING ACCESSORY ATTACHMENT FOR A CYCLE

The present invention relates to cycles, such as bicycles, mopeds, and the like, and more particularly to an attachment element to attach an accessory, such as a luggage carrier, a kickstand, or the like, to the frame of the cycle. For ease of explanation, reference will be made to "cycles" in general, to be generic both to bicycles, mopeds, motorcycles, and the like, that is, in general, to structures which have forked frames or frame struts.

BACKGROUND

Frequently, accessory elements such as kickstands, luggage carriers, baskets, and the like, are attached to cycles. To attach the accessory, it is customary to clamp a counterelement on the accessory, or secured thereto against a clamping plate, with parallel or essentially parallel struts of the cycle frame interposed. The counterelement and the clamping plate are then clamped together by a screw. Usually, the surface or counterplate of the accessory is essentially flat. The clamping plate, in order to permit centering of an attachment screw or bolt passing between forked strut elements of the cycle is frequently formed with essentially parallel grooves or bumps, corresponding to the position or expected position of the struts of the cycle. The clamping plates are stiff and have little elasticity. To properly tighten the clamping screw or bolt without deforming the usually tubular frame struts of the cycle and, on the other hand, prevent loosening under vibration or shock of the bolt, it is necessary to carefully tighten the clamping screw and use appropriate lock washers and the like. In spite of the use of lock washers, however, vibrations and shock which are transmitted to the clamping attachment, and hence to the accessory, are substantial. Overtightening of the clamping bolt, or clamping bolts if a plurality are provided, which might involve complete compression of lock washers, or the like, may result in deformation of the clamping plate and/or of the struts of the cycle to which it is attached. Deforming the struts and/or the clamping plate causes loss of strength of the respectively deformed element and, usually, additionally scars the painted surfaces of the struts of the cycle. The clamping plates usually have sharp edges and, upon cutting through the paint on the frame of the cycle or the struts thereof, the sharp edges damage the paint or enamel covering so that the strut may be subjected to rusting at the point of attachment. The clamping plates may be made of sheet steel or, in some instances, may be made of aluminum, for example as aluminum castings. The clamping plates made of steel are comparatively heavy and require surface treatment to prevent corrosion.

Clamping plates made as aluminum castings, usually pressure castings, are also comparatively heavy since the material utilization factor is poor. In order to permit inexpensive manufacture, the aluminum elements are solid. It is not possible to use recessed screws or Allenhead screws with such elements since the recess of the screw head would decrease the strength of aluminum blocks sufficiently to provide for effective holding. The aluminum pressure plates or pressure blocks cannot be used with all types of cycles, particularly racing and sporting bicycles, since the spacing between the main pedal bearing and the outer circumference of the wheel or tire is insufficient to permit placement of an aluminum cast block or plate.

THE INVENTION

It is an object to improve the attachment arrangements for accessories to cycles, particularly for attachments which can be applied by a user or purchaser of the cycle, which arrangements utilize material effectively and efficiently, are self-centering, can be used with cycles of various types and dimensions, and which avoids any difficulties with respect to damage to the frame or self-loosening of an attachment screw or bolt.

Briefly, a clamping element is provided, through which a bolt or screw can be passed, the clamping element having a a crosspiece formed with a central portion and two lateral flanges, the crosspiece spanning the space between spaced support struts of the cycle. In accordance with a feature of the invention, the flange portions are constructed as similar, outwardly extending wings in the form of wedge elements, with upper and lower surfaces which diverge, starting from outer end portions, inwardly or centrally towards the central portion, to form two wedge-shaped wings. In cross section, in a plane parallel to the axis of the clamping bolt hole or aperture, and transverse to the struts of the cycle, the wedge elements or wings define triangles which have theoretical parallel bases adjacent the central portion of the clamping element. To provide for self-holding, centering, and tight engagement, the flange portions are elastically deformable in a direction parallel to the axis of the aperture.

The essentially triangular shape of the flanges having diverging surfaces results in self-centering of the element between spaced struts of the cycle; the element, thus, will assume a preferred position centered between the struts. Even if a counter or attachment plate or element of the accessory is flat and plane, centering of the accessory with respect to the struts of the cycle is readily obtained. It is not necessary to fit the attachment element or the surface of the accessory which engages the struts specifically to specific cycles or struts thereof.

The feature of elastic deformation of the flanges in the direction parallel to the axis of the aperture or crossbore to receive the clamping board results in substantial spacing between the points at which torque is applied against the struts of the cycle. This reduces any possibility of damage to the struts and, effectively, provides for clamping of the accessory to the struts since the application torque can be reduced. The seating is tight and snug, so that loosening of the clamping bolt is readily avoided. The elasticity of the flange portions also permits tight seating on divergent struts, since the flange portions can, elastically, adapt to non-parallel struts.

In accordance with a preferred feature of the invention, the block is symmetrical with respect to a plane transverse to the axis of the aperture. This will result in the outer surfaces of the flange forming engagement surfaces which are symmetrical with respect to this median plane. This arrangement has the advantage that a specific placement of the attachment element with respect to the cycle is not necessary and it can be placed either side against the struts of the cycle. It is, however, also possible to make the engagement surfaces somewhat different, for example to form one of the surfaces at the central portion of the attachment element with a relief or countersunk bore to permit use of a recessed bolt, for example an Allen head bolt for the attachment screw or bolt to provide for neat, flush placement of the attachment screw or bolt. Alternatively, or additionally, one side of the element in the region of the central aperture can be cut with a groove so dimensioned that a standard hexagonal nut is retained therein and restrained from rotation, to provide for threading of a bolt therethrough without requiring additional holding tools for the nut when attaching the accessory element. Without changing the structure, and merely by turning the structure over, selectively, either a nut can be inserted in an open groove or, from the other side, a reset screw or bolt can be inserted in a countersunk hole. Without change of the structure itself, thus, various attachment arrangements present themselves.

In accordance with a preferred feature of the invention, the outer surfaces of each one of the flange or wing portions are flat and diverge from the outer tips towards the center at angles which are symmetrical with respect to a median plane through the attachment element, and hence will be inclined at the same angle with respect to the axis of the bore or aperture to receive the attachment bolt.

The attachments elements may be a solid block; in accordance with a feature of the invention, however, and higher elasticity is obtained with less material, if the respective flange or wing portions are formed with a hollow space therethrough which, in cross section, is similar to the shape or projected outline of the flange. Such hollow spaces preferably are generally prismatic and pass entirely through the respective flange.

The attachment element is easily made by cutting selected lengths off a rolled or extruded rail of the appropriate shape, preferably formed with the bore or opening therein. Use of material and of the raw material for the element is particularly efficient in such an arrangement. The attachment element preferably, in a projection on a plane extending at right angles to the axis of the aperture or through-bores, is essentially rectangular.

The central portion of the attachment element preferably, in cross section, is essentially rectangular so that the overall structure will be a flattened hexagon. The central portion of the element may also be formed with a hollow space to reduce the weight and material requirements of the element.

A suitable material for the element is any light-metal alloy, such as an aluminum alloy, which can be made either as an injection molding or as an extrusion or rolled rail, from which the elements themselves are then cut off. Other materials are plastics which, likewise, may be made as injected elements or cut from long rails.

DRAWINGS

DETAILED DESCRIPTION

Figure 1:
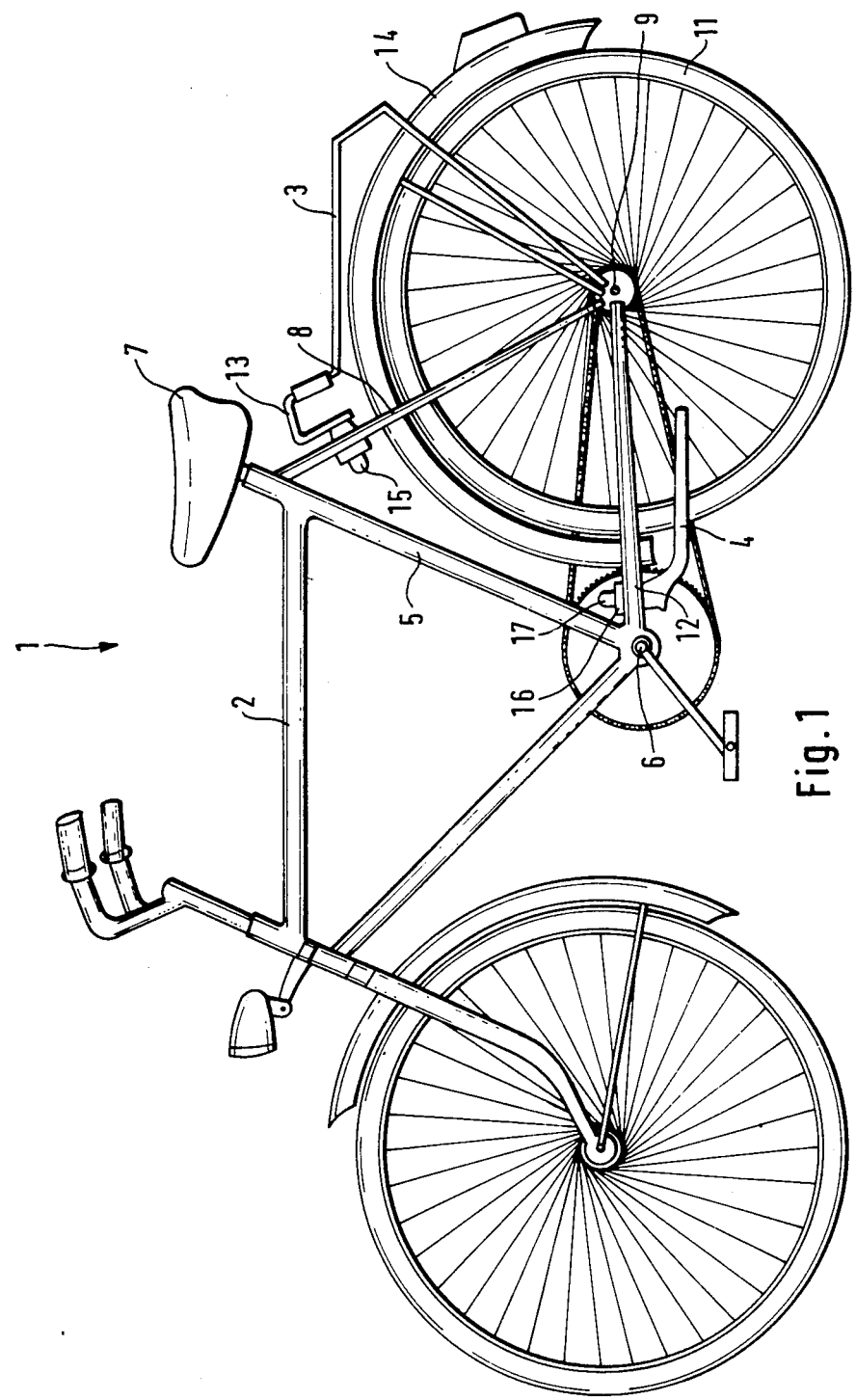
FIG. 1 is a schematic side view of a bicycle having, as accessories, a luggage carrier and a kickstand, in which the luggage carrier and the kickstand are attached to struts of the bicycle.

By way of example of a cycle, FIG. 1 shows a side view of a bicycle 1 having a frame 2 which has struts 8, 12 which are forked, and extend to the rear axle of the bicycle. The bicycle has accessory elements such as a luggage carrier 3 and a kickstand 4 attached thereto. The bicycle frame has a saddle tube 5, attached at its lower end to the crank bearing housing 6. A saddle 7 is supported, as is customary, on the saddle tube 5. The struts 8, extending from the saddle tube 5 towards the rear axle 9 of the bicycle, are essentially parallel, although they may diverge slightly, depending on bicycle construction. Even if they diverge, the angle of divergence is small, so that they can be considered to be "essentially parallel". A rear wheel 11, rotatable about the rear axis 9, is secured in well known and standard manner to the terminal ends of the rear forks 8. Two essentially parallel struts extend from the crankshaft bearing housing 6 towards the axle 9 of the rear wheel, to be attached there to the struts 8 so that the axle 9 can be suitably attached to the junction region of the struts 8 and 12 in accordance with any well known and customary arrangement.

The accessory element 3, forming the luggage carrier, is attached to the rear fork struts 8 by attachment element 13. The attachment element 13 is located between the upper side of a fender 14 and the saddle 7. The attachment element 13 is clamped in position by a clamping screw 15. Similarly, a kickstand 4 and forming another accessory element, is secured to the lower fork struts 12 between the crankshaft bearing 6 and the lower end of the fender or mudguard 14 by a further attachment element 16 and a clamping screw 17.

The attachment elements 13 and 16 can be identical. They have the structure shown in detail in FIG. 3.

The respective attachment element 13, 16 is a unitary structure which has a generally block-shaped central portion 18 and two laterally unitary flange or wing portions 19, 21. The theoretical transition zone between the central portion 18 and the two wings or flanges 19, 21 are shown by broken lines 22, 23.

The central portion 18 has a cross bore or aperture 24, of essentially cylindrical cross section, to receive an attachment bolt or screw 17. In addition, the central portion 18 is formed with a hollow space 25, extending at right angles to the axis of the cross bore 25. The hollow space 25 extends from one facing side 26 towards the other facing side 27. The two facing or end sides 26, 27 are parallel to each other and parallel to the axis of the bore or aperture 24.

The two flange or wing portions 19, 21 have, generally, the shape of an acute-angle three-corner prism which has lateral surfaces 22, 23, unitary with the central portion 18, and second lateral surfaces 28, 29 and 31, 32, forming the engagement surfaces of the respective elements 13, 16 on the cycle frame struts 8, 12, respectively. The respective end surfaces or facing surfaces 26, 27 of the element 16 form the base surfaces of the prisms which define the flanges 19, 21. The cross section of the element 16, thus, has the shape of a flattened hexagon. The respective flat surfaces 28, 29 and 31, 32 converge, starting from the central portion 18, and terminate in rounded ends 33, 34, to merge into each other. The surfaces 28, 31 converge in the direction of the central or cross bore or aperture 24; likewise, surfaces 29 and 32 of the flanges 19, 21 converge towards the center portion 18 and the aperture 24.

Figure 3:
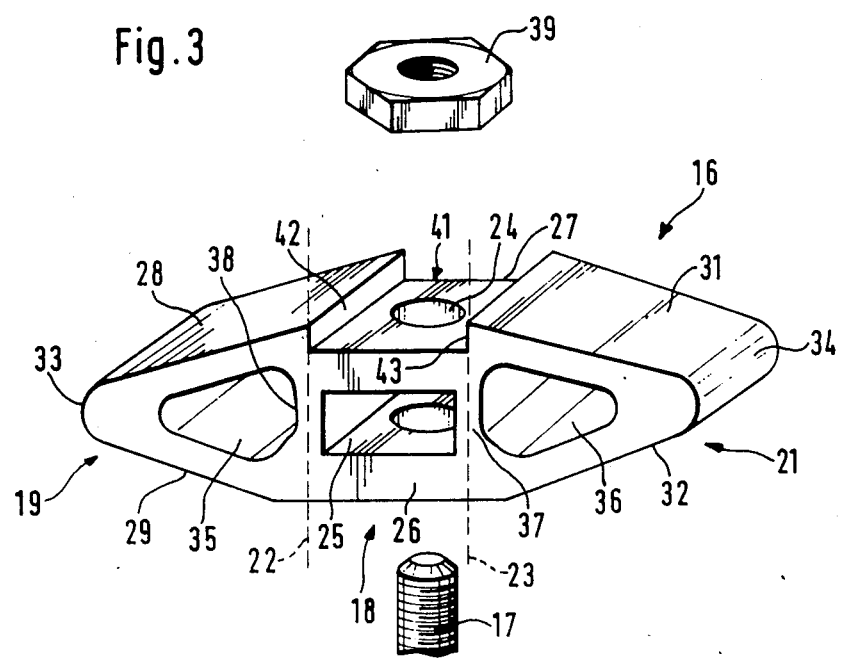
FIG. 3 is an exploded view of the attachment element of the present invention.

Flanges 19, 21 are formed with openings or hollow zones or spaces 35, 36. This insures better utilization of material, reduces the weight, and increases the elasticity of the flanges 19, 21 in a direction parallel to the axis of the bore or aperture 24. The cross section of the respective hollow spaces or apertures 35, 36 corresponds, essentially, to the shape of the flnages 19,21, as best seen in FIG. 3. The hollow spaces or apertures extend clear through the respective element, that is, from one facing surface 26 over to the other facing surface 27. In other words, the spaces 35, 36, just like the space 25, are open at both ends. The result will be two parallel ribs 37, 38 positioned in the range of the center portion 18, through which the cross bore 35 extends.

The element 16 can be selectively attached either by a recess head screw or bolt, such as an Allen bolt, or by means of a nut with a standard screw 17. One side of the element 16 has an enlarged countersink 24a, surrounding the cross bore or opening 24, for example to receive a flush head of flat head screw. The upper side—as shown in FIG. 3—is formed with a groove 41 extending from one facing side 26 to the facing side 27. The groove 41 is defined by parallel flanks 42, 43, located in the region of the ribs 37, 38. The spacing of the two flanks 42, 43 corresponds to the width of a standard nut 39, which can be slipped between the flanks 42, 43 and is reliably held in position against rotation upon tightening of bolt 17, see FIG. 2. The bottom of the nut 39 engages the surface of the groove 41, by flat engagement, or by interposition of a washer.

The specific shape of the attachment element 16 can readily be made by cutting a suitable length, corresponding to the width of the element, from a rail having the cross-sectional shape of the element; other than forming the cross bore 24 and, if desired, the countersink 24a, no further machining or working is necessary. A suitable material is a light-metal alloy, for example made of a metal which does not corrode or is highly corrosion-resistant. If such metals are used, no further surface treatment, painting,or the like, is needed.

Figure 2:
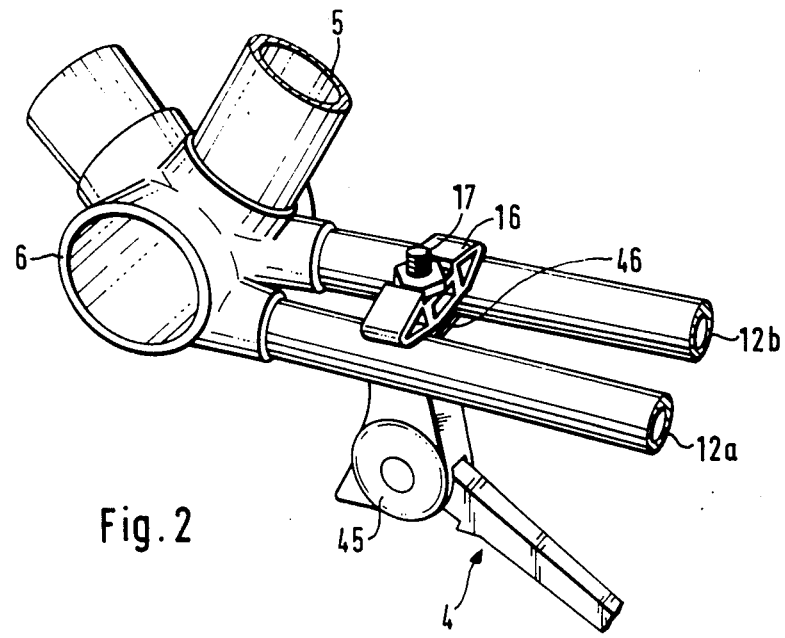
FIG. 2 is a fragmentary enlarged view of the region of the main crankshaft bearing of the bicycle and illustrating attachment of a kickstand and using the present invention.

FIG. 2 illustrates, in detail, the use of the attachment element 16 to attach a kickstand 4. The kickstand 4 has a support plate forming an engagement surface 46, which carries the kickstand bearing 45, and such other structural elements as may be used, such as springs, and the like, not shown. The surface 46 is engaged against the bottom of the fork struts 12a, 12b. The attachment element 16 is then placed, fitted with its opening or bore 24 about the bolt 17, extending, in well known and suitable manner, from the kickstand 4. Due to the convergence of the surfaces 29, 32 or 28, 31, respectively, the surface 46 as well as the attachment element 16 will be automatically centered. Screw 17, extending through the surface 46, can then be tightened and the attachment element 16 is clamped with respect to the struts 12a, 12b. Nut 39 is seated in groove 41, restrained from rotation by the dimensioning of the nut and the groove. It is not necessary to tighten the nut with a separate wrench; revolution of the nut is reliably prevented since the element 16 cannot rotate due to its preferred position between the struts 12a, 12b and the nut 39 is fitted in the groove 41. Upon tightening of the nut 17, flanges 19, 21 can deflect slightly in a direction parallel to the axes of the bore 24, upwardly, so that the elastic deformation of the wing portions or flange portions will be accepted thereby, and, even under extremes of vibrations and shock, the screw 17 will not loosen from the nut 39. The screw 17 is held under appropriate tension at all times, preventing self-loosening thereof.

The placement of the element 16, longitudinally of the struts 12a, 12b can be as selected; even if the struts 12a, 12b have different widths from each other, or diverge slightly, the resilient self-centering effect is retained, and no change in the element 16 is necessary.

The clamping arrangement thus is universally applicable to cycles of various manufactures, with different strut configurations, spacings and angles of divergence.

The invention has been described, so far, specifically with respect to attachment of a kickstand. Attachment of the luggage carrier 3 is similar.

The clamping element 16, with the flange or wing portions 19, 21, automatically insures self-centering between the frame elements, and resistance to rotation of the element 16. The plane, tapering outer surfaces 28, 29 and 31 32 provide, in a projection to a plane parallel to the axis of the cross bore 24 and parallel to an end or facing surface 26, 27 similar triangular shape. The base of the triangle is formed by the center portion. the outer surfaces 28, 29, 31, 32 of the flange portions 19, 21, defining similar angles with respect to the cross bore 24. This insures self-centering under all conditions. A suitable angle of any one of the surfaces 28, 29, 31, 32 with respect to the axis of the cross bore 24 is about 15°, so that the angles of the triangles defined, for example, by the surfaces 28, 29 will be about 30°. This is a suitable value, although it is not critical.

Various changes and modifications may be made within the scope of the inventive concept.

I claim:

1. In combination with a cycle (1) having spaced, essentially parallel or slightly diverging support struts (8, 12; 12a, 12b),
    a vibration-resistant, self-centering attachment element (13, 16) for attachment of an accessory, particularly of a luggage carrier (3) or a kickstand (4) to the cycle,
    wherein the accessory (3, 4) includes counter holding means forming a bearing surface (3a, 4a; 46) for engagement with the support struts,
    said attachment element (13, 16) having a cross piece formed with a central portion (18) and two lateral flange portions (19, 21) spanning the space between the spaced support struts, an aperture (24) formed in the central portion of the cross piece having an aperture axis extending perpendicularly to a theoretical plane connecting said flange portions and a clamping screw (17) passing through the aperture and into the counter holding means,
    and wherein, in accordance with the invention,
    the element is formed with facing end surfaces (26, 27) located in essentially parallel planes,which essentially parallel planes are parallel with respect to the axis of the aperture (24),
    the flange portions (15, 21) form similar wedge elements with upper and lower surfaces diverging from outer end portions (33, 34) of the wedge elements towards the central portion (18), which define, in cross section in a plane parallel to the axis of the aperture and transverse to the struts, triangles which have bases (22, 23) adjacent the central portion (18);
    the flange portions (19, 21) are elastically deformable in a direction parallel to the axis of the aperture (24);
    the similar wedge elements of the flange portions are formed with hollow spaces (35, 36) which, in cross section, correspond essentially to the cross section of the respective flange portion, and extend from one facing end surface (26) of the respective flange portion to the other facing end surface (27) thereof; and wherein the central portion (18) is formed with an essentially rectangular prismatic hollow space (25) extending from one facing end surface (26) to another facing end surface (27) of the attachment element.

2. The attachment element of claim 1, wherein the flange portions (19, 21) have outer surfaces (28, 29, 31, 32) which define engagement surfaces for engagement with said struts (8, 12).

3. The attachment element of claim 1, wherein the flange portions (19, 21) are formed with outer surfaces (28, 29, 31, 32) which are essentially flat, and which are inclined by similar angles with respect to the axis of said aperture (28).

4. The attachment element of claim 3, wherein the angle of inclination of any one of the outer surfaces (28, 29, 31, 32) of the flange portions with respect to the axis of the aperture is in the order of about 15°.

5. The attachment element of claim 4, wherein the accessory comprises a kickstand (4).

6. The attachment element of claim 4, wherein the central portion is formed with a surface groove (41) located between the flange portions (19, 21), said groove having a width dimension matching the minimum cross section of a polygonal screw nut (39) to hold said polygonal screw nut against rotation within the groove;

and wherein the accessory comprises a kickstand (4).

7. The attachment element of claim 4, wherein the central portion is formed with a surface groove (41) located between the flange portions (19, 21), said groove having a width dimension matching the minimum cross section of a polygonal screw nut (39) to hold said polygonal screw nut against rotation within the groove;

and wherein the accessory comprises a luggage carrier (3).

8. The attachment element of claim 1, wherein the central portion (18), in cross section, is essentially rectangular and unitary with the flange portions (19, 21) forming said similar wedge elements, whereby, in projection parallel to one of the facing end surfaces (26, 27), the clamping element will have the shape of a flattened hexagon.

9. The attachment element of claim 1, wherein the hollow space of the central portion has an axis extending parallel to the hollow spaces (35, 36) formed in the flange portions (19, 21);

and wherein the central portion is formed with cross ribs (37, 38) separating the hollow spaces (35, 36) within the flange portions from the hollow space (25) within the central portion.

10. The attachment element of claim 1, wherein the central portion is formed with a surface groove (41) located between the flange portions (19, 21), said groove having a width dimension matching the minimum cross section of a polygonal screw nut (39) to hold said polygonal screw nut against rotation within the groove.

11. The attachment element of claim 10, wherein the groove has essentially parallel, flat walls, and extends from one facing end surface (26) of the element to another facing end surface (27), said groove having a flat surface which is perpendicular to the axis of said aperture (24).

12. The attachment element of claim 10, wherein the accessory comprises a luggage carrier (3).

13. The attachment element of claim 10, wherein the accessory comprises a kickstand (4).

14. The attachment element of claim 1, wherein the element comprises a cut-off portion of a shaped rail.

15. The attachment element of claim 1, wherein the element comprises an aluminum alloy.

16. The attachment element of claim 1, wherein the accessory comprises a luggage carrier (3).

17. The attachment element of claim 1, wherein the accessory comprises a kickstand (4).

* * * * *